United States Patent
Ito (10) Patent No.: US 10,062,956 B2
(45) Date of Patent: Aug. 28, 2018

(54) ANTENNA DEVICE AND ELECTRONIC APPARATUS

(71) Applicant: Murata Manufacturing Co., Ltd., Nagaokakyo-shi, Kyoto-fu (JP)

(72) Inventor: Hiromitsu Ito, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 189 days.

(21) Appl. No.: 15/297,195

(22) Filed: Oct. 19, 2016

(65) Prior Publication Data

US 2017/0040663 A1    Feb. 9, 2017

Related U.S. Application Data

(63) Continuation of application No. PCT/JP2015/062037, filed on Apr. 21, 2015.

(30) Foreign Application Priority Data

Apr. 30, 2014  (JP) .................................. 2014-093324

(51) Int. Cl.
| | |
|---|---|
| *H01Q 1/22* | (2006.01) |
| *H01Q 7/00* | (2006.01) |
| *H01Q 7/06* | (2006.01) |
| *H04B 5/02* | (2006.01) |
| *H01Q 1/38* | (2006.01) |
| *H01Q 1/48* | (2006.01) |
| *H04B 5/00* | (2006.01) |

(52) U.S. Cl.
CPC ............ *H01Q 1/2258* (2013.01); *H01Q 1/38* (2013.01); *H01Q 1/48* (2013.01); *H01Q 7/00* (2013.01); *H01Q 7/06* (2013.01); *H04B 5/0031* (2013.01); *H04B 5/02* (2013.01)

(58) Field of Classification Search
None
See application file for complete search history.

(56) References Cited

U.S. PATENT DOCUMENTS

| | | | |
|---|---|---|---|
| 2012/0262357 A1 | 10/2012 | Kato et al. | |
| 2012/0325915 A1 | 12/2012 | Kato et al. | |
| 2013/0147675 A1* | 6/2013 | Kato | ................. H01Q 1/38 343/788 |
| 2013/0307746 A1 | 11/2013 | Nakano et al. | |

(Continued)

FOREIGN PATENT DOCUMENTS

| | | |
|---|---|---|
| JP | 8-195618 A | 7/1996 |
| JP | 2010-98504 A | 4/2010 |
| JP | 2011-97657 A | 5/2011 |

(Continued)

OTHER PUBLICATIONS

Official Communication issued in corresponding International Application PCT/JP2015/062037, dated Jun. 9, 2015.

*Primary Examiner* — Dameon E Levi
*Assistant Examiner* — David Lotter
(74) *Attorney, Agent, or Firm* — Keating & Bennett, LLP (57) ABSTRACT

An antenna device includes a conductive member and a wiring substrate including a coupling line that is conductive. The antenna device includes connecting conductors electrically connecting the conductive member and the coupling line. A feeding coil magnetic-field coupled to the coupling line is arranged on the wiring substrate.

20 Claims, 10 Drawing Sheets (56) References Cited

U.S. PATENT DOCUMENTS

2014/0203981 A1    7/2014  Nakano et al.

FOREIGN PATENT DOCUMENTS

| JP | 5246764 B2 | 7/2013 |
| JP | 5403146 B2 | 1/2014 |
| JP | 2014-75775 A | 4/2014 |
| JP | 2014-140253 A | 7/2014 |
| WO | 2013/042604 A1 | 3/2013 |
| WO | 2014/003163 A1 | 1/2014 |

* cited by examiner

ANTENNA DEVICE AND ELECTRONIC APPARATUS

CROSS REFERENCE TO RELATED APPLICATIONS

This application claims the benefit of priority to Japanese Patent Application 2014-093324 filed Apr. 30, 2014, and is a Continuation Application of PCT/JP2015/062037 filed on Apr. 21, 2015. The entire contents of each application are hereby incorporated herein by reference.

BACKGROUND OF THE INVENTION

1. Field of the Invention

The present invention relates to an antenna device for use in a near field radio communication system or the like and to an electronic apparatus including the antenna device.

2. Description of the Related Art

In radio frequency identification (REID) of the 13.56 MHz range, such as near field communication (NFC), typically, an integrated circuit (IC) chip for REID and matching element are mounted on a circuit board, an antenna is attached to an inner surface of a terminal housing made of resin, and the IC chip for REID and antenna are connected to each other with a spring pin or the like interposed therebetween in a direct current manner.

Recently, wireless communication devices, such as cellular phone terminals, have become thinner and thinner, and the use of metals in a wide area of a housing has increased to solve a shortage of strength created by the reduction in thickness. However, the metallic portion in the housing shields an antenna incorporated in the terminal, and this causes the problem that communication with a device on a partner side is not established.

Thus, as in Japanese Unexamined Patent Application Publication No. 2011-97657, there is proposed an antenna device having a structure in which a metal plate with a wider area than an antenna coil is placed in the vicinity of (magnetic-field coupled to) the antenna coil and the metal plate is used as a radiator.

Problems to be solved in the antenna device illustrated in Japanese Unexamined Patent Application Publication No. 2011-97657 are described below.

The antenna device described in Japanese Unexamined Patent Application Publication No. 2011-97657 includes a coil conductor and a conductive member magnetic-field coupled to the coil conductor. The conductive member has a conductor aperture and a slit extending from the conductor aperture to an edge portion of the conductive member. The coil conductor is arranged such that its coil aperture portion overlaps the conductor aperture in the conductive member. When a current flows through the coil conductor, a current flows through an outer edge portion of the conductive member in the same direction as that of the current flowing through the coil conductor, whereas a current flows through the peripheral area (inner edge) of the conductor aperture in the vicinity of the coil conductor in a direction opposite to that of the current flowing through the coil conductor. The presence of the area where the current flows in the opposite direction leads to a reduced inductance of the antenna, which results in the problem of degrading communication characteristics. In addition, the strength of an induced current largely varies depending on variations in the position where the coil conductor and conductive member are attached and in the distance between the coil conductor and conductive member when they are attached, and thus there is a problem in that the inductance value tends to vary.

SUMMARY OF THE INVENTION

Preferred embodiments of the present invention provide an antenna device including an antenna device that prevents or reduces a degradation and variation in inductance of the antenna device as viewed from a feeder circuit and that prevents or reduces a degradation and variation in communication characteristics.

An antenna device according to a preferred embodiment of the present invention includes a conductive member, a wiring substrate including a coupling line having conductivity, a connecting conductor electrically connecting the conductive member and the coupling line, and a feeding coil disposed on the wiring substrate and magnetic-field coupled to the coupling line. At least the conductive member, the coupling line, and the connecting conductor define a current path.

An electronic apparatus according to a preferred embodiment of the present invention includes an antenna device. The antenna device includes a conductive member, a wiring substrate including a coupling line that is conductive, a connecting conductor electrically connecting the conductive member and the coupling line, and a feeding coil disposed on the wiring substrate and magnetic-field coupled to the coupling line. At least the conductive member, the coupling line, and the connecting conductor define a current path.

According to various preferred embodiments of the present invention, decreases and variations in inductance of the antenna device as viewed from the feeder circuit are small, and degradation and variations in communication characteristics are significantly reduced or prevented.

The above and other elements, features, steps, characteristics and advantages of the preferred embodiments of the present invention will become more apparent from the following detailed description of the preferred embodiments with reference to the attached drawings.

DETAILED DESCRIPTION OF THE PREFERRED EMBODIMENTS

A plurality of preferred embodiments of the present invention are described below by using some specific examples with reference to the drawings. The same reference numerals are used in the same locations in the drawings. The preferred embodiments are illustrative, and configurations shown and described in different preferred embodiments may be partially replaced or combined. In the descriptions of the preferred embodiments subsequent to a first preferred embodiment, description of features and elements common to a first preferred embodiment is omitted, and different aspects are described. In particular, the same or substantially the same operational advantages derived from the same or substantially the same configuration are not explained in detail in each preferred embodiment.

First Preferred Embodiment

Figure 1:
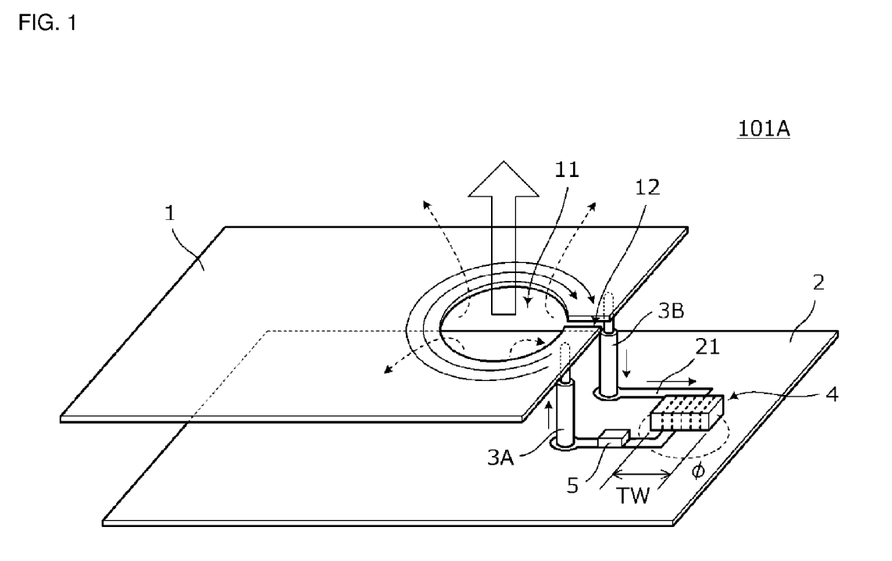
FIG. 1 is a perspective view of an antenna device according to a first preferred embodiment of the present invention.

FIG. 1 is a perspective view of an antenna device 101A included in a portable electronic apparatus or the like according to a first preferred embodiment of the present invention. The antenna device 101 includes a conductive member 1 and a wiring substrate 2. A coupling line 21 that is conductive is disposed on the wiring substrate 2. The conductive member 1 and coupling line 21 are electrically connected to each other with connecting conductors 3A and 3B interposed therebetween. One example of each of the connecting conductors 3A and 3B may be a spring pin.

A feeding coil 4 is magnetic-field coupled to the coupling line 21 and mounted on the wiring substrate 2. The wiring substrate 2 is connected to a chip capacitor 5 connected in series to the coupling line 21. In the present preferred embodiment, the capacitor connected to the coupling line 21 preferably is a chip capacitor, for example. It may be replaced with another type of capacitor, such as a lead capacitor.

The conductive member 1 includes a cut portion defined by a conductor aperture 11 and a slit 12. The connecting conductors 3A and 3B are connected to locations between which the cut portion (in particular the slit 12 in the example shown in FIG. 1) is positioned.

Figure 2:
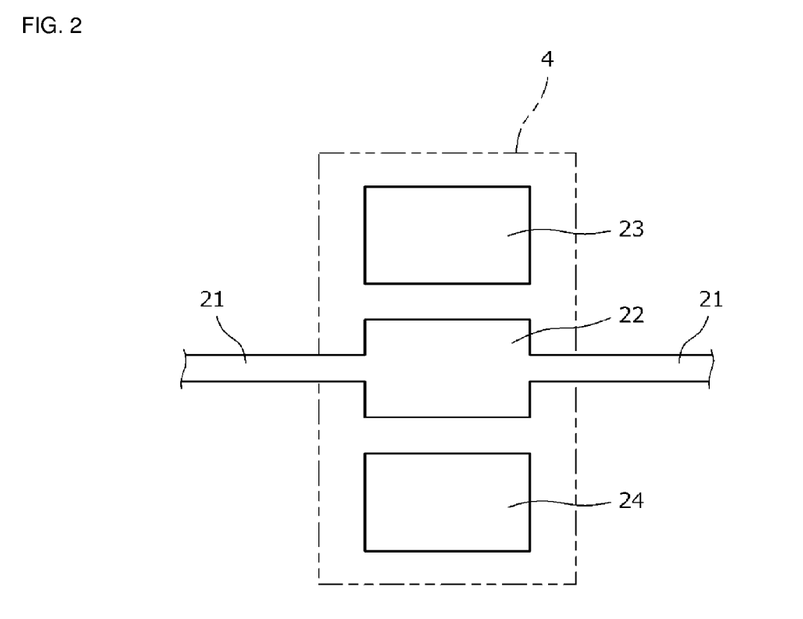
FIG. 2 is a partial plan view that illustrates a conductive pattern in a location where a feeding coil 4 is mounted on a wiring substrate.

FIG. 2 is a partial plan view that illustrates a conductive pattern in a location where the feeding coil 4 is mounted on the wiring substrate 2. A portion of the coupling line 21 is defined as a terminal 22. Terminals 23 and 24 are located on opposite sides of the terminal 22 portion in the coupling line 21 (opposite sides between which the coupling line 21 is positioned). As described below, the feeding coil 4 preferably includes three terminals on the surface on which it is mounted, and these three terminals are connected to the terminals 22, 23, and 24 of the wiring substrate 2, for example.

Figure 3:
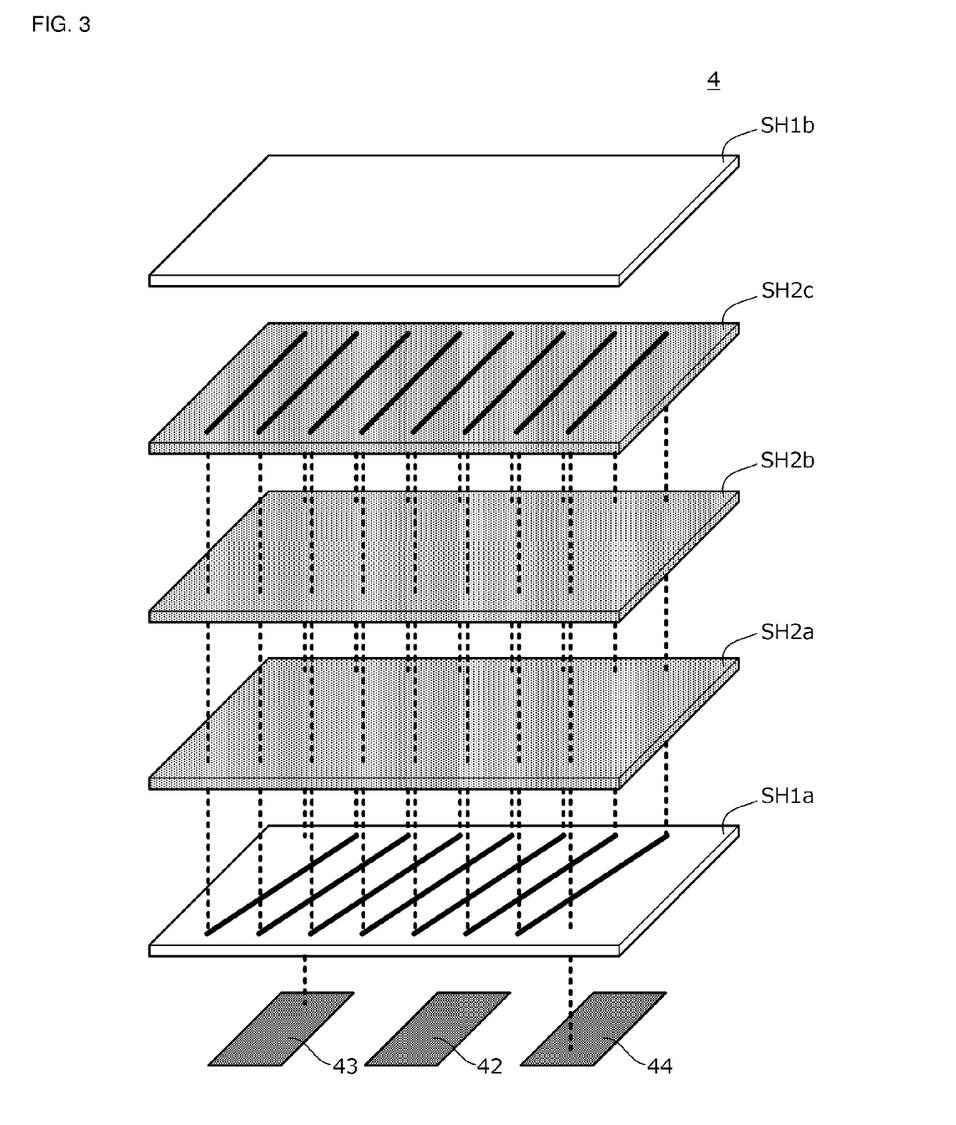
FIG. 3 is an exploded perspective view that illustrates a configuration of the feeding coil.

FIG. 3 is an exploded perspective view that illustrates a configuration of the feeding coil 4. The feeding coil 4 preferably is a multilayer body of magnetic layers SH2a, SH2b, and SH2c and non-magnetic layers SH1a and SH1b, for example. A plurality of linear conductors are disposed on the magnetic layer SH2c and non-magnetic layer SH1a. The magnetic layers SH2a, SH2b, and SH2c include via conductors connecting the linear conductors. Those linear conductors and via conductors are coil conductors in the feeding coil 4. Input and output terminals 43 and 44 and a coupling-line connection terminal 42 are disposed on a lower surface of the non-magnetic layer SH1a. The magnetic layers SH2a, SH2b, and SH2c and non-magnetic layer SH1a include via conductors connecting end portions of the linear conductors on both outer side portions among the plurality of linear conductors disposed on the magnetic layer SH2c to the input and output terminals 43 and 44. In that way, the feeding coil 4 preferably is a chip component, and the terminals 42, 43, and 44 on the lower surface are connected to the terminals 22, 23, and 24 in the wiring substrate 2 shown in FIG. 2. The coupling-line connection terminal 42 in the feeding coil 4 is connected to the terminal 22 in the wiring substrate 2, but is not electrically coupled to the coil conductors. As described above, because the terminal 22 is contiguous to the coupling line 21, high strength of close contact with the wiring substrate 2 is achieved.

The coil conductors in the feeding coil 4 and the coupling line 21 are magnetic-field coupled to each other. In FIG. 1, a magnetic flux $\phi$ indicates this magnetic-field coupling. As shown in FIG. 1, the winding axis of the feeding coil 4 is parallel or substantially parallel to a surface of the wiring substrate 2 and is perpendicular or substantially perpendicular to the portion in the coupling line 21 near the feeding coil 4. The line width of the coupling line 21 is smaller than a coil winding width TW of the feeding coil 4. Thus, the magnetic flux passing through the coil aperture of the feeding coil 4 efficiently circulates around the coupling line 21, and the coil conductors in the feeding coil 4 and the coupling line 21 are effectively coupled.

The conductive member 1, coupling line 21, and connecting conductors 3A and 3B define a current path. In transmission from the antenna device 101A, a current flows through that current path. That is, a current flows (is distributed) as indicated by the solid-line arrows in FIG. 1 in the conductive member 1 through the connecting conductors 3A and 3B. In particular, the current focuses along the edge of the conductor aperture 11. This results in generation of a magnetic field indicated by the broken-line arrows and thick arrow in FIG. 1. That magnetic field enables magnetic-field coupling to an antenna on a communication partner side. In reception at the antenna device 101A, a current induced in the conductive member 1 is extracted in the locations where the connecting conductors 3A and 3B are connected.

Figure 4:
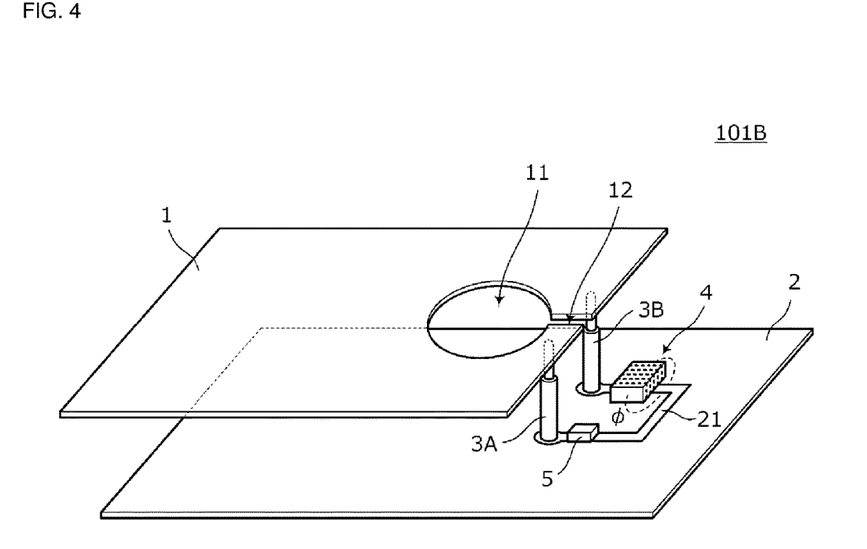
FIG. 4 is a perspective view of another antenna device according to the first preferred embodiment of the present invention.

FIG. 4 is a perspective view of an antenna device 101B according to the first preferred embodiment. The antenna device 101B shown in FIG. 4 differs from the antenna device 101A shown in FIG. 1 in the location where the feeding coil 4 is arranged. In the antenna device 101B, the winding axis of the feeding coil 4 is parallel or substantially parallel to a surface of the wiring substrate 2 and is perpendicular or substantially perpendicular to the portion in the coupling line 21 near the feeding coil 4. Thus, as with the antenna device 101A, the feeding coil 4 and coupling line 21 are magnetic-field coupled to each other.

Figure 5:
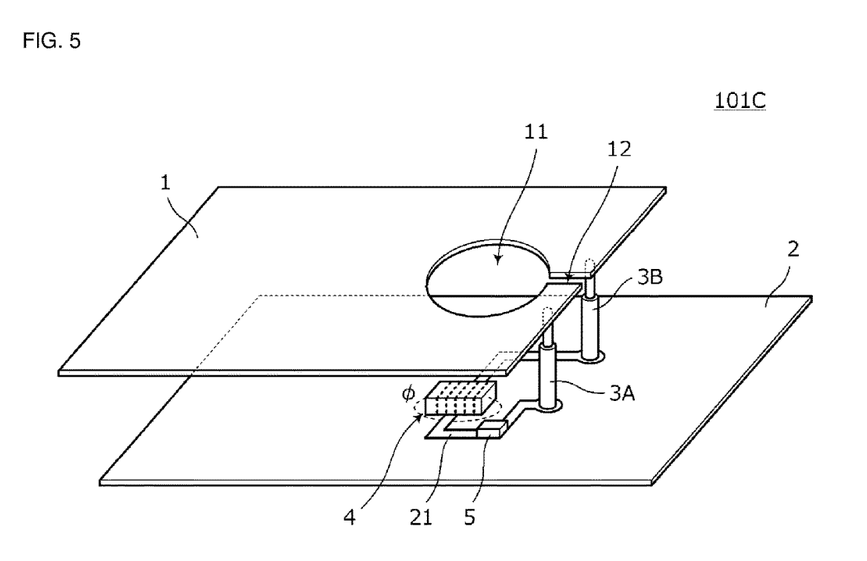
FIG. 5 is a perspective view of yet another antenna device according to the first preferred embodiment of the present invention.

FIG. 5 is a perspective view of an antenna device 101C according to the first preferred embodiment. The antenna device 101C differs from the antenna devices 101A and 101B shown in FIGS. 1 and 4 in the location where the coupling line 21, feeding coil 4, and chip capacitor 5 are arranged. The feeding coil 4 overlaps the conductive member 1 as seen in plan view.

In the antenna device 101C, the winding axis of the feeding coil 4 is parallel or substantially parallel to a surface of the wiring substrate 2 and is perpendicular or substantially perpendicular to the portion in the coupling line 21 near the feeding coil 4. Thus, as with the antenna devices 101A and 101B, the feeding coil 4 and coupling line 21 are magnetic-field coupled to each other.

Figure 6:
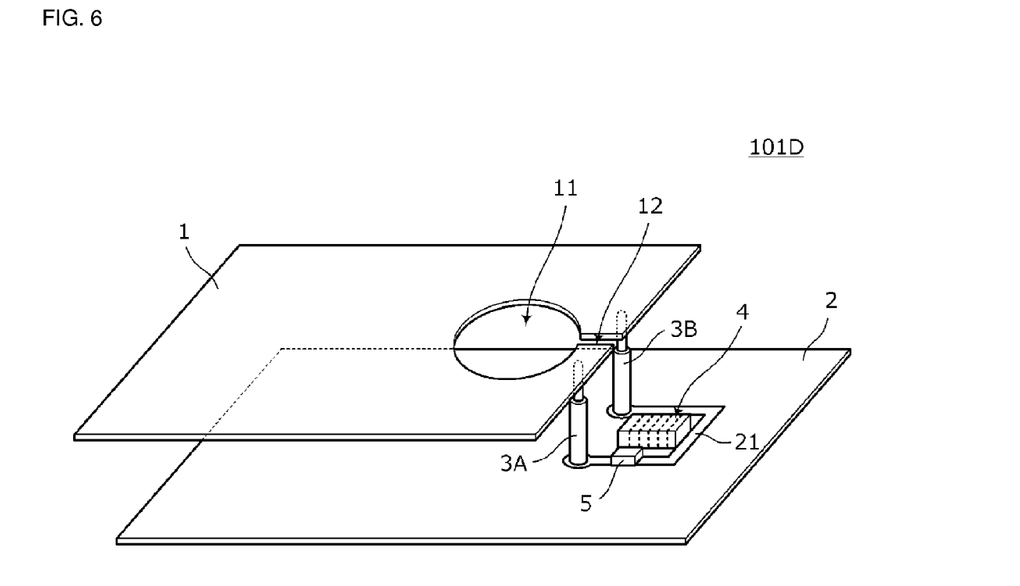
FIG. 6 is a perspective view of still another antenna device according to the first preferred embodiment of the present invention.

FIG. 6 is a perspective view of an antenna device 101D according to the first preferred embodiment. The antenna device 101D differs from the antenna device 101A shown in FIG. 1 in the location where the feeding coil 4 is arranged. In the antenna device 101D, the feeding coil 4 and coupling line 21 do not overlap each other as seen in plan view. The winding axis of the feeding coil 4 is perpendicular or substantially perpendicular to the coupling line 21. Thus, as with the antenna device 101A and other devices, the feeding coil 4 and coupling line 21 are magnetic-field coupled to each other.

As in the above-described some examples, the feeding coil 4 is arranged in a location where it is magnetic-field coupled to the coupling line 21. Accordingly, the feeding coil 4 is mounted on the wiring substrate 2 without being restricted by a positional relationship with the conductive member 1 and cut portion (conductor aperture 11, slit 12). By setting the location where the feeding coil 4 is arranged, the degree of coupling to the coupling line 21 is improved or optimized. Because the feeding coil 4 is coupled to the coupling line 21 in the state where they are near each other, the coupling is stronger, in comparison with a case where the coupling is based on the conductive member 1 and cut portion (11, 12). Because the coupling line 21 is a conductive pattern and is thin, linkage of a magnetic flux generated from the feeding coil 4 easily occurs and the coupling is strong. Because the feeding coil 4 and coupling line 21 are strongly coupled to each other, in comparison with the case where the feeding coil 4 is coupled to the conductive member 1 and cut portion (11, 12), a smaller coil with low inductance, a coil in which radiation of a magnetic flux for coupling is weak, or the like can also be used as the feeding coil 4.

In a configuration in which a secondary coil in a transformer is electrically and directly connected in series to the coupling line 21 and a primary coil in the transformer is connected to a feeder circuit, the ratio of inductance of the coupling line 21 to inductance of the conductive member 1 is high, due to the secondary coil located inside the transformer and a magnetic material in the transformer. When the ratio of inductance of the coupling line is high, the performance of the conductive member 1 as a radiating element degrades. In contrast, according to the present preferred embodiment, because the inductance of the coupling line 21 is reduced, inductance contributed to coupling to the antenna on the communication partner side can be increased. Because the degree of coupling between the feeder circuit and the antenna device (conductive member 1) depends on the structure of the transformer, it is difficult to adjust the degree of coupling to obtain the optimal performance. According to the present preferred embodiment, the degree of coupling to obtain the optimal performance is easily set by the location where the feeding coil is arranged with respect to the coupling line. In addition, because it is not necessary to join to the coupling line by, for example, soldering, high reliability is achieved.

In a configuration in which the conductive member 1 and wiring substrate 2 are electrically coupled to each other at a predetermined location with a spring pin interposed therebetween, the feeding coil is preferably mounted adjacent to the spring pin on the wiring substrate, the spring pin and the feeding coil are magnetic-field coupled to each other, and thus electricity is fed into the conductive member, the location where the feeding coil is mounted is preferably adjacent to the spring pin, and the feeding coil for being strongly magnetic-field coupled to the spring pin has a low degree of flexibility in its winding direction.

Second Preferred Embodiment

Figure 7:
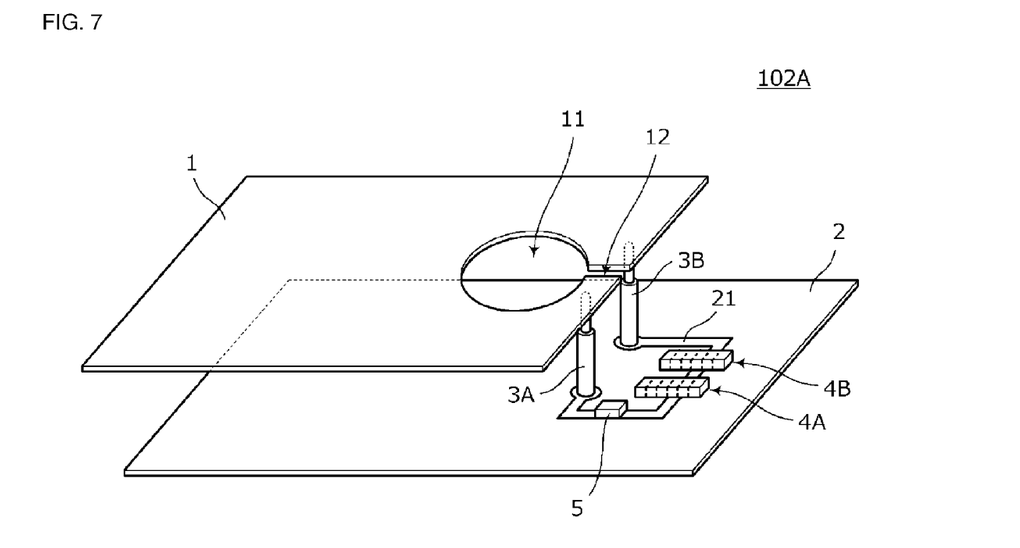
FIG. 7 is a perspective view of an antenna device according to a second preferred embodiment of the present invention.

FIG. 7 is a perspective view of an antenna device 102A according to a second preferred embodiment of the present invention. The antenna device 102A includes a conductive member 1 and a wiring substrate 2. A coupling line 21 that is conductive is disposed on the wiring substrate 2. The conductive member 1 and coupling line 21 are electrically connected to each other with connecting conductors 3A and 3B interposed therebetween. Two feeding coils 4A and 4B preferably are magnetic-field coupled to the coupling line 21 and mounted on the wiring substrate 2, for example. The wiring substrate 2 is connected to a chip capacitor 5 connected in series to the coupling line 21.

The configuration of each of the feeding coils 4A and 4B is shown in FIG. 3. The two feeding coils 4A and 4B are connected in series or parallel to each other and are connected to the feeder circuit.

In accordance with a preferred embodiment of the present invention, an antenna device can include three or more feeding coils. The polarities of the feeding coils are preferably set so that the feeding coils do not form a closed loop of a magnetic flux. According to this arrangement of the feeding coils, the antenna device and feeder circuit are effectively coupled. In the case of a series connection, the size of each of the feeding coils 4A and 4B is reduced, and space in the locations where the feeding coils are arranged is effectively utilized. In the case of a parallel connection, a loss in the conductors is reduced, and the antenna characteristics is enhanced.

Figure 8:
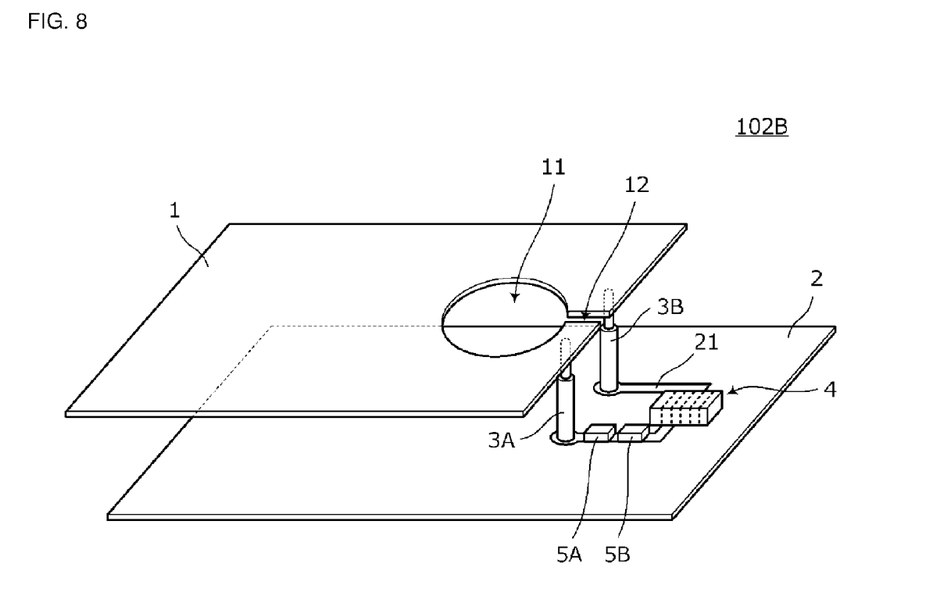
FIG. 8 is a perspective view of another antenna device according to the second preferred embodiment of the present invention.

FIG. 8 is a perspective view of an antenna device 102B according to the second preferred embodiment. In contrast to the embodiment shown in FIG. 1, the preferred embodiment shown in FIG. 8 preferably includes two chip capacitors 5A and 5B that are connected in series with the coupling line 21.

When the antenna device 102B is used in a HF band, the chip capacitors 5A and 5B preferably have capacitances of about several thousand pF, for example, to provide a low withstand voltage. In communication, coupling to an antenna on a partner side may cause a relatively high voltage, for example, about 20 volts AC, to be applied to the antenna device 102B. However, if a plurality of chip capacitors are connected in series, in accordance with the second preferred embodiment, a voltage applied to each of the capacitors relatively low, and therefore, chip components with low withstand voltage can be included in the antenna device.

In accordance with a preferred embodiment of the present invention, an antenna device can include three or more chip capacitors. The chip capacitors are preferably connected in parallel to provide a high degree of flexibility in setting a combined capacitance and allows finely setting a resonant frequency of the antenna device.

Third Preferred Embodiment

Figure 9:
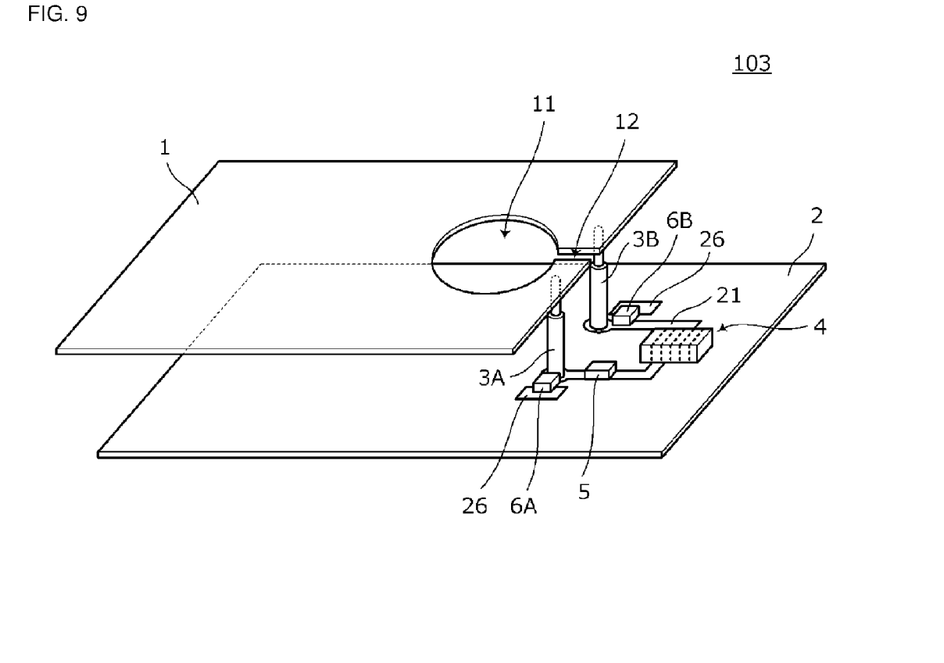
FIG. 9 is a perspective view of an antenna device according to a third preferred embodiment of the present invention.

FIG. 9 is a perspective view of an antenna device 103 according to a third preferred embodiment of the present invention. The antenna device 103 includes a conductive member 1 and a wiring substrate 2. A coupling line 21 that is conductive is disposed on the wiring substrate 2. The conductive member 1 and coupling line 21 are electrically connected to each other with connecting conductors 3A and 3B interposed therebetween. A feeding coil 4 is magnetic-field coupled to the coupling line 21 and mounted on the wiring substrate 2. The wiring substrate 2 is connected to a chip capacitor 5 connected in series to the coupling line 21.

Ground patterns 26 are disposed on the wiring substrate 2. Chip capacitors 6A and 6B are disposed between the ground patterns 26 and coupling line 21. The ground patterns 26 are preferably in a vicinity of or adjacent to the locations where the connecting conductors 3A and 3B and coupling line 21 are connected.

The chip capacitors 6A and 6B preferably have capacitances that are equivalently open or substantially equivalently open at a frequency of communication signals transmitted from or received by the antenna device 103 (for example, about 13.56 MHz) and that are equivalently short or substantially equivalently short at frequencies for other systems (for example, the UHF band). Preferably, at frequencies used in other systems, the base portions of the connecting conductors 3A and 3B are grounded to the ground with the chip capacitors 6A and 6B interposed therebetween.

In the above-described arrangement, the conductive member 1 is grounded in a high-frequency manner, the potential of the conductive member 1 is stabilized, and the electrostatic shielding effect is increased. Thus, the influences on or from the other systems are reduced or prevented. For example, if the antenna device 103 is embedded in a communication terminal device or the like together with a UHF-band antenna for data communication or conversation, adverse influence on and from the communications in the UHF band is relatively small.

Fourth Preferred Embodiment

Figure 10:
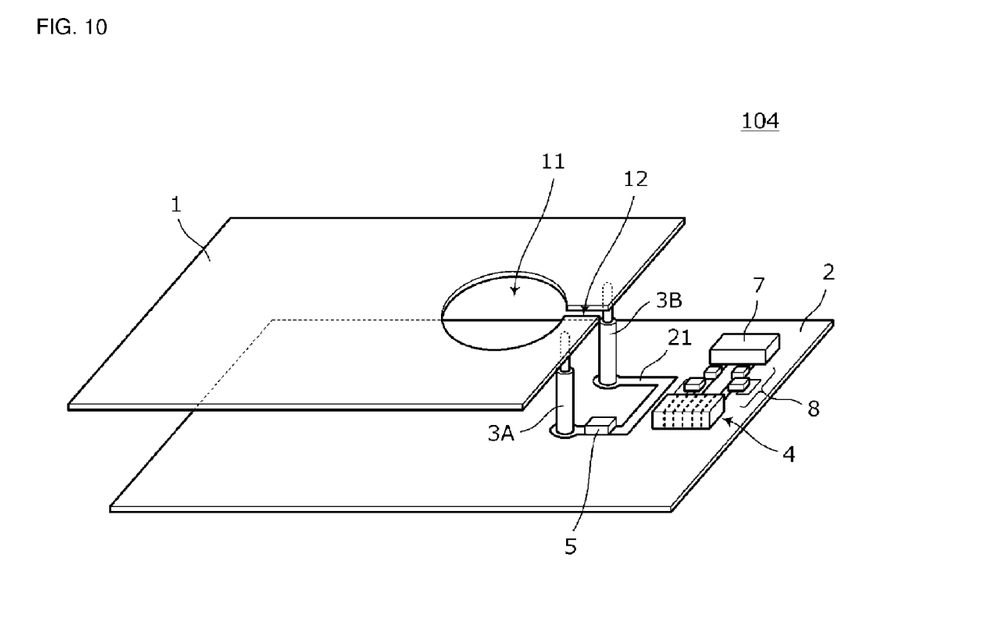
FIG. 10 is a perspective view of an antenna device according to a fourth preferred embodiment of the present invention.

FIG. 10 is a perspective view of an antenna device 104 according to a fourth preferred embodiment of the present invention. The antenna device 104 includes a conductive member 1 and a wiring substrate 2. A coupling line 21 that is conductive is disposed on the wiring substrate 2. The conductive member 1 and coupling line 21 are electrically connected to each other with connecting conductors 3A and 3B arranged therebetween. A feeding coil 4 is magnetic-field coupled to the coupling line 21 and mounted on the wiring substrate 2. The wiring substrate 2 is connected to a chip capacitor 5 connected in series to the coupling line 21. In addition, the wiring substrate 2 is connected to an RFIC 7 and a matching circuit 8 includes matching circuit components.

Preferably, the RFIC 7 (including the feeder circuit) and the matching circuit are disposed on the wiring substrate 2 on which the coupling line 21 is disposed. Accordingly, the antenna device may be integral with the feeder circuit.

Fifth Preferred Embodiment

Figure 11A:
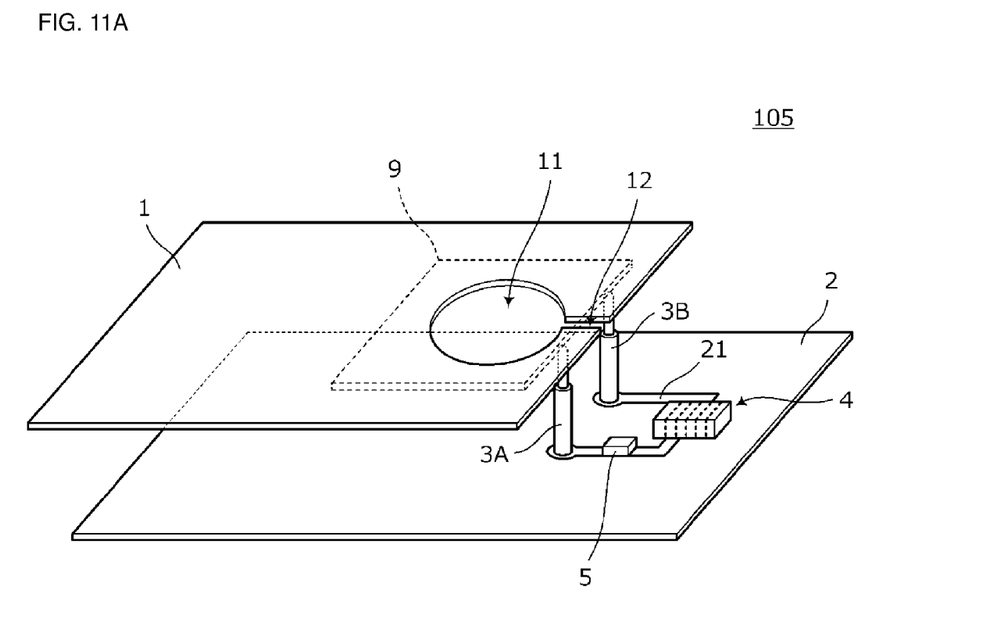
FIG. 11A is a perspective view of an antenna device according to a fifth preferred embodiment of the present invention.
Figure 11B:
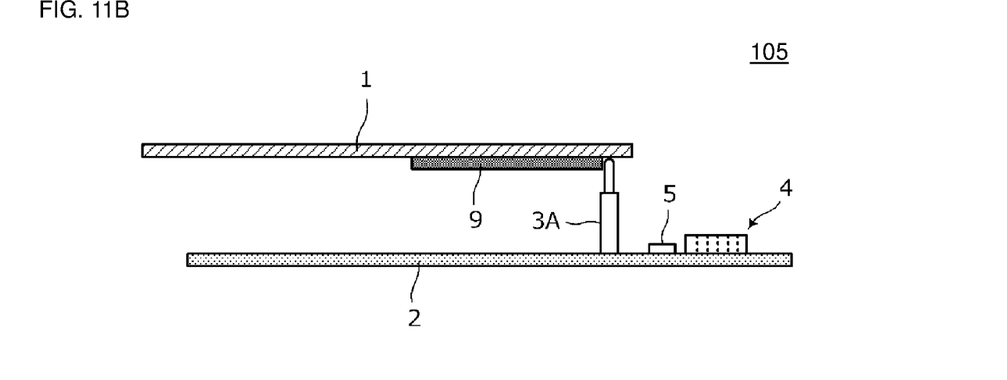
FIG. 11B is a front view of the antenna device.

FIG. 11A is a perspective view of an antenna device 105 according to a fifth preferred embodiment of the present invention, and FIG. 11B is a front view of the antenna device 105. The antenna device 105 is embedded in a portable antenna device or the like. The antenna device 105 includes a conductive member 1 and a wiring substrate 2. A coupling line 21 that is conductive is disposed on the wiring substrate 2. The conductive member 1 and coupling line 21 are electrically connected to each other with connecting conductors 3A and 3B interposed therebetween.

A feeding coil 4 is magnetic-field coupled to the coupling line 21 and mounted on the wiring substrate 2. The wiring substrate 2 is connected to a chip capacitor 5 connected in series to the coupling line 21.

A magnetic sheet 9, for example, a ferrite sheet, is attached to a back side of the conductive member 1. The back side of the conductive member 1 is preferably a surface of the conductive member 1 that faces the wiring substrate 2, as shown in FIGS. 11A and 11B. The magnetic sheet 9 is positioned in a location that covers a portion of the conductive member 1 that is in a vicinity or adjacent to the cut portion (conductor aperture 11 and slit 12), that is, a portion where a current density (magnetic field strength) is high.

With the above-described configuration, of the inductance occurring in the conductive member 1, in particular, inductance contributed to coupling to an antenna on a communication partner side increases, thus providing high communication performance.

Without the magnetic sheet 9, a magnetic field produced by a current flowing along the cut portion in the conductive member 1 would induce an eddy current in a ground electrode on the wiring substrate 2, which reduces the operation of the conductive member 1 as a radiating element. However, according to the fifth preferred embodiment, the magnetic field produced by the current flowing along the cut portion in the conductive member 1 is shielded by the magnetic sheet 9, which reduces the effect of eddy currents on the operation of the conductive member 1.

The magnetic sheet 9 is not limited to the shape covering the cut portion and may include a shape that covers only the periphery of the cut portion, that is, a shape that does not cover the conductor aperture 11 or slit 12. If the magnetic sheet 9 includes the shape covering only the periphery of the cut portion, the above-described advantage of reducing the eddy current still is obtained.

Sixth Preferred Embodiment

Figure 12:
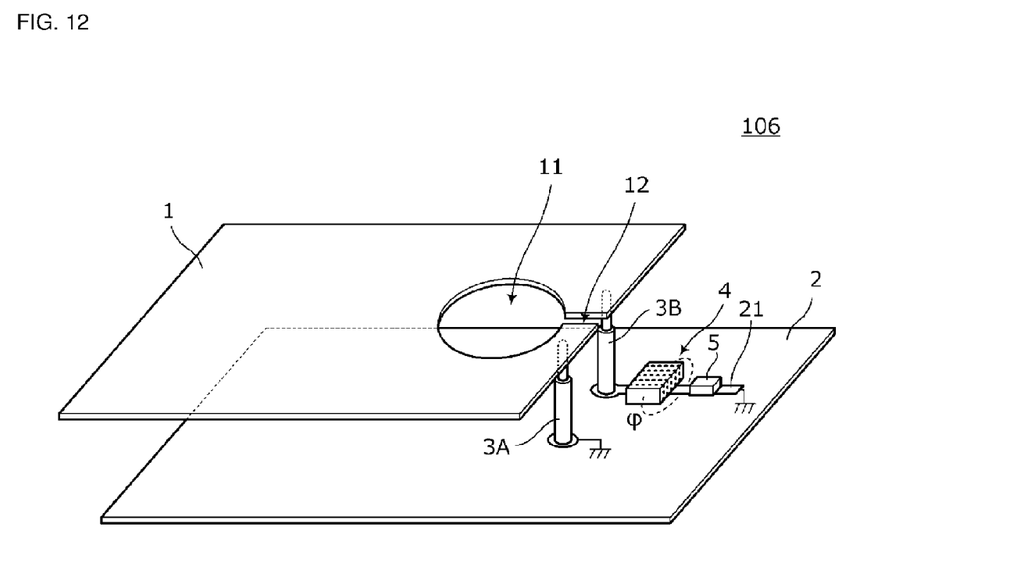
FIG. 12 is a perspective view of an antenna device according to a sixth preferred embodiment of the present invention.

FIG. 12 is a perspective view of an antenna device 106 according to a sixth preferred embodiment of the present invention. In contrast to the antenna devices 101A, 101B, etc. of the first preferred embodiment, the ground conductors of the sixth preferred embodiment are used as a portion of the current path. As shown in FIG. 12, a portion such as end portion of the coupling line 21 is connected to a ground conductor on the wiring substrate 2, and the connecting conductor 3A is also connected to a ground conductor on the wiring substrate 2. Accordingly, the conductive member 1, connecting conductors 3A and 3B, coupling line 21, and ground conductors define a current path.

According to the sixth preferred embodiment, routing of the coupling line 21 on the wiring substrate 2 is not needed, and a space utilized by the coupling line 21 in the wiring substrate 2 is reduced. If the ground conductor is disposed over the entire surface of the wiring substrate 2, the conductive member 1 and coupling line 21 can be connected to the ground conductor in any location in the conductive member 1 with the connecting conductors 3A and 3B arranged therebetween. Accordingly, the sixth preferred embodiment provides high flexibility in the arrangement of the connecting conductors 3A and 3B, coupling line 21, feeding coil 4, and chip capacitor 5. The current path formed by the conductive member 1, connecting conductors 3A and 3B, coupling line 21, and ground conductor can include any shape, and the high flexibility can be provided for design relating to radiation characteristics of the antenna device.

Seventh Preferred Embodiment

Figure 13:
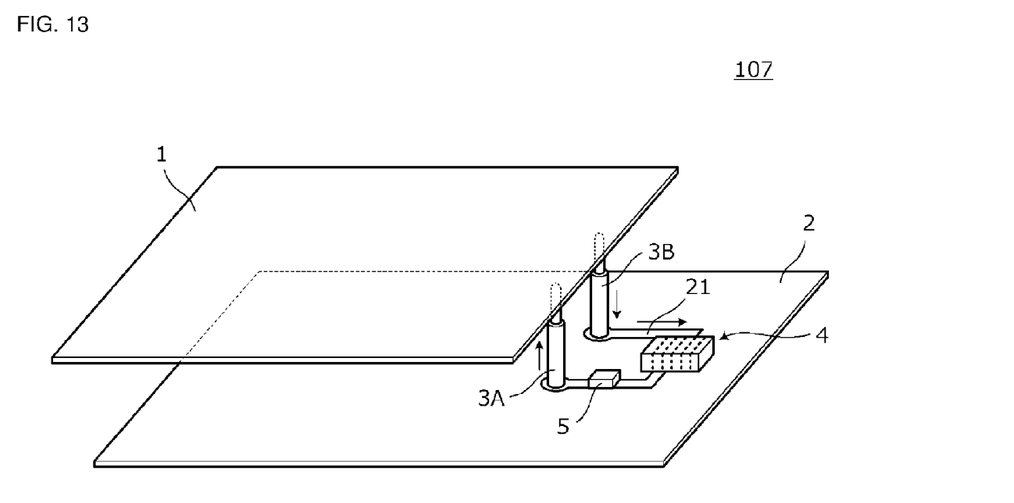
FIG. 13 is a perspective view of an antenna device according to a seventh preferred embodiment of the present invention.

FIG. 13 is a perspective view of an antenna device 107 according to a seventh preferred embodiment of the present invention. In contrast to the antenna devices 101A and 101B shown in the first preferred embodiment, the antenna device 107 of the seventh preferred embodiment does not include either the conductor aperture 11 or slit 12 in the conductive member 1.

As described above, the conductor aperture 11 and slit 12 are optional features. According to the antenna device 107 of the seventh preferred embodiment, when the antenna device 107 is in transmission, a magnetic flux is emitted from a loop defined by the current path defined by the coupling line 21, connecting conductors 3A and 3B, and conductive member 1. When the antenna device 107 is in reception, a magnetic flux emitted from an antenna on a communication partner side passes through the loop defined by the current path formed by the coupling line 21, connecting conductors 3A and 3B, and conductive member 1, thus causing the loop of the current path and the antenna on the communication partner side to be coupled to each other.

Eighth Preferred Embodiment

Figure 14:
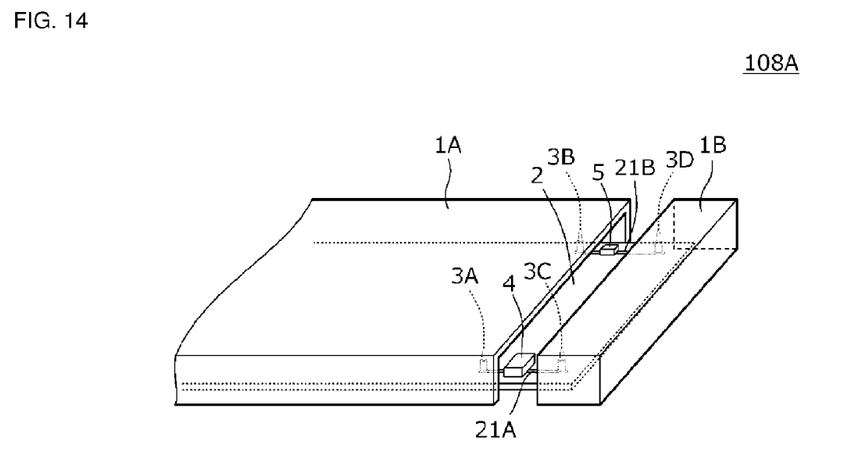
FIG. 14 is a partial perspective view of an antenna device 108A according to an eighth preferred embodiment of the present invention.

FIG. 14 is a partial perspective view of an antenna device 108A according to an eighth preferred embodiment of the present invention. The antenna device 108A includes two conductive members 1A and 1B. The conductive members 1A and 1B are a portion of a housing to accommodate a wiring substrate 2. The conductive member 1A includes a main portion of the housing, whereas the conductive member 1B includes a portion of a principal surface of the housing, both side surfaces of the housing, and an end surface of the housing. Coupling lines 21A and 21B are disposed on the wiring substrate 2. A feeding coil 4 is mounted (placed) in a location where it is coupled to the coupling line 21A on the wiring substrate 2. The coupling line 21B is connected in series to a chip capacitor 5. Each of the conductive members 1A and 1B is not limited to the shape shown in FIG. 14. For example, the coupling lines 21A and 21B may have shapes with rounded corners.

The coupling lines 21A and 21B are electrically coupled to the conductive member 1A with the connecting conductors 3A and 3B interposed therebetween. The coupling lines 21A and 21B are also electrically coupled to the conductive member 1B with connecting conductors 3C and 3D interposed therebetween. Accordingly, the coupling lines 21A and 21B and conductive members 1A and 1B define a current path.

Figure 15:
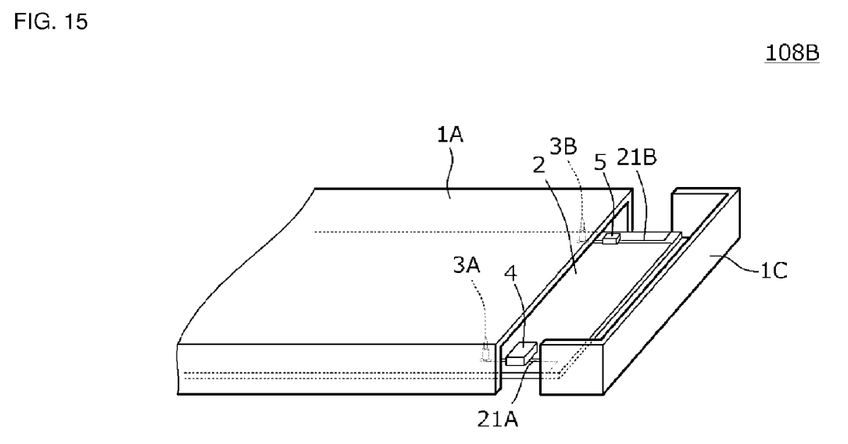
FIG. 15 is a partial perspective view of another antenna device according to the eighth preferred embodiment of the present invention.

FIG. 15 is a partial perspective view of an antenna device 108B according to the eighth preferred embodiment. The antenna device 108B includes two conductive members 1A and 1C. The conductive members 1A and 1C are a portion of a housing for containing a wiring substrate 2. The conductive member 1A includes a main portion of the housing, whereas the conductive member 1B includes a portion of both side surfaces of the housing and an end surface of the housing. Coupling lines 21A and 21B are disposed on the wiring substrate 2. A feeding coil 4 is mounted in a location where it is coupled to the coupling line 21A on the wiring substrate 2. The coupling line 21B is connected in series to a chip capacitor 5.

The coupling lines 21A and 21B are electrically coupled to the conductive member 1A with the connecting conductors 3A and 3B interposed therebetween. The coupling lines 21A and 21B are also connected to the conductive member 1C. Accordingly, the coupling lines 21A and 21B and conductive members 1A and 1C define a current path.

As described above, a plurality of conductive members may be used in a portion of a current path. The conductive members 1A, 1B, and 1C may include, for example, a metallic housing in a wireless communication apparatus equipped with the antenna device 108B. The conductive members 1B and 1C may be included in, for example, a radiating element that operates as a standing-wave antenna for UHF band or the like in a wireless communication apparatus. The standing-wave antenna is an antenna in which a radiating element resonates and voltage and current standing waves are distributed and from which an electromagnetic wave is emitted. Examples thereof may include a patch antenna, such as an inverted-F antenna, monopole antenna, one-wavelength loop antenna, inverted-L antenna, and planar inverted-F antenna (PIFA), a slot antenna, and a notch antenna.

Ninth Preferred Embodiment

Figure 16:
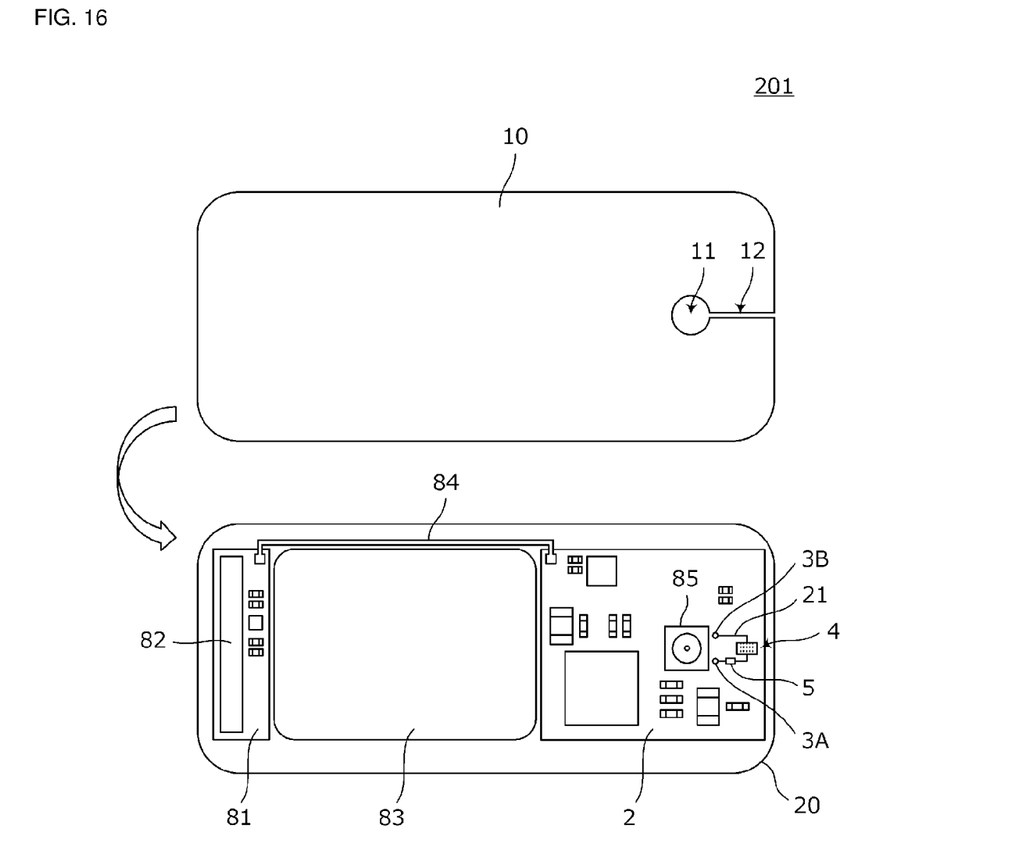
FIG. 16 is a plan view of an inner portion of a housing in a wireless communication apparatus according to a ninth preferred embodiment of the present invention.

FIG. 16 is a plan view of an inner portion of a housing in a wireless communication apparatus 201 according to a ninth preferred embodiment of the present invention. As shown in FIG. 16, a lower housing 10 and an upper housing 20 of the wireless communication apparatus 201 are separated and the inner portion of the wireless communication apparatus 201 is exposed. Wiring substrates 2 and 81, a battery pack 83, and the like are contained in an inner portion of the upper housing 20. A coupling line 21 is arranged on the wiring substrate 2. Connecting conductors 3A and 3B being spring pins, a feeding coil 4, chip capacitor 5, RFIC, and the like are mounted on and connected to the wiring substrate 2. The wiring substrate 2 is preferably equipped with a camera module 85 or the like. The wiring substrate 81 is also preferably equipped with a UHF antenna 82 or the like. The wiring substrate 2 and wiring substrate 81 are connected to each other with a coaxial cable 84 interposed therebetween.

The lower housing 10 includes a conductor aperture 11 and slit 12. The conductor aperture 11 is disposed in a location that faces the camera module 85. The connecting conductors 3A and 3B are in contact with locations between which the slit 12 in the lower housing 10 is positioned in the lower housing 10. Another device, such as a button or speaker, may be arranged in the conductor aperture 11.

In the above-described configuration, the lower housing 10 operates as a radiating element.

Other Preferred Embodiments

In the preferred embodiments of the present invention described above, the coupling line 21 preferably is disposed on a front side (surface on which the feeding coil 4 is mounted) of the wiring substrate 2. However, the coupling line 21 may be disposed on a layer different from the surface on which the feeding coil 4 is mounted. For example, in FIG. 1, the feeding coil 4 may be arranged on a back side of the wiring substrate 2. The wiring substrate 2 may be a multilayer substrate, and the coupling line 21 may be disposed in an inner layer therein.

In the preferred embodiments of the present invention described above, the coil conductors in the feeding coil 4 preferably are magnetic-field coupled to a single line of the coupling line 21. However, a planar coil pattern including a plurality of turns may be included in the antenna device, and the coil conductors in the feeding coil 4 may be magnetic-field coupled to a plurality of lines of the coupling lines. In addition, the wiring substrate 2 may be a multilayer substrate, the coupling line 21 with a plurality of turns may be formed by using a plurality of layers in the wiring substrate, and the coil conductors in the feeding coil 4 may be magnetic-field coupled to a plurality of lines of the coupling lines.

In the preferred embodiments of the present invention described above, a portion of the coupling line 21 coupled to the coil conductors in the feeding coil 4 and a portion uncoupled thereto include the same line width. The portions may include different line widths. For example, the inductance and resistance of the coupling line may be reduced by an arrangement in which, of the coupling line 21, the portion coupled to the feeding coil 4 includes a narrow line width and the portion uncoupled thereto includes a wide line width. The inductance and resistance of the coupling line may also be reduced by a configuration in which the number of lines or the number of layers in the portion uncoupled is increased.

In the preferred embodiments of the present invention described above, the coupling line preferably includes a U shape. However, the coupling line is not limited to this shape and may include a simple line segment shape. The coupling line may also include a curved shape.

In the preferred embodiments of the present invention described above, the conductor aperture 11 in the conductive member 1 preferably is an aperture that faces the camera module. However, an aperture for an operation button on a side surface of the housing or aperture for an earphone jack may also be used as the conductor aperture in the conductive member 1.

In the preferred embodiments of the present invention described above, the antenna devices each include the conductive member 1 with the cut portion. However, the cut portion may be omitted, and the connecting conductors 3A and 3B may be connected to two locations in a conductive member with no cut portion. In this case, because of the edge effect, a current focuses along the edge of the conductive member 1. In transmission, when a distributed current flows in the conductive member 1, a magnetic field is emitted from the conductive member 1. In reception, a current induced in the conductive member 1 is extracted in the locations where the connecting conductors 3A and 3B are connected.

In the preferred embodiments described above, spring pins are used as the connecting conductors to connect the coupling line and conductive member. However, the coupling line and the conductive member may be connected to each other with metal screws, a flexible substrate, cable, or the like interposed therebetween.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An antenna device comprising:
   a conductive member;
   a wiring substrate including a coupling line that is conductive and different from the conductive member;
   a connecting conductor electrically connecting the conductive member and the coupling line; and
   a feeding coil disposed on the wiring substrate and magnetic-field coupled to the coupling line; wherein
   at least the conductive member, the coupling line, and the connecting conductor define a current path.

2. The antenna device according to claim 1, wherein an end of the coupling line is connected to a ground electrode, and at least the conductive member, the connecting conductor, the coupling line, and the ground electrode define the current path.

3. The antenna device according to claim 1, wherein the conductive member includes a cut portion, and the connecting conductor is one of a plurality of connecting conductors between which the cut portion is positioned.

4. The antenna device according to claim 3, further comprising a magnetic sheet that covers a portion of the conductive member that is adjacent to the cut portion in the conductive member.

5. The antenna device according to claim 4, wherein the magnetic sheet is mounted to a surface of the conductive member that faces the wiring substrate.

6. The antenna device according to claim 1, further comprising a capacitor connected to the coupling line.

7. The antenna device according to claim 6, further comprising a second capacitor connected in series with the capacitor.

8. The antenna device according to claim 1, wherein a winding axis of the feeding coil is parallel or substantially parallel to a surface of the wiring substrate.

9. The antenna device according to claim 1, wherein at least a portion of the coupling line is perpendicular or substantially perpendicular to the winding axis of the feeding coil.

10. The antenna device according to claim 1, wherein a capacitor connected to the connecting conductor to allow high-frequency signals to be transmitted directly to ground is disposed on the wiring substrate.

11. The antenna device according to claim 1, wherein the feeding coil includes a coupling-line connection terminal isolated from an input and output terminal in the feeding coil, and the coupling-line connection terminal in the feeding coil is soldered to the coupling line.

12. The antenna device according to claim 1, wherein the wiring substrate is a multilayer substrate, and the coupling line is disposed on a layer different from a surface on which the feeding coil is mounted.

13. The antenna device according to claim 1, wherein a feeder circuit connected to the feeding coil is disposed on the wiring substrate.

14. The antenna device according to claim 1, wherein a width of the coupling line is smaller than a coil winding width of the feeding coil, and when the conductive member is seen in plan view, a width of the conductive member is larger than the coil winding width of the feeding coil.

15. The antenna device according to claim 1, further comprising a second feed coil connected in series with the feed coil.

16. The antenna device according to claim 1, further comprising a second feed coil connected in parallel with the feed coil.

17. An electronic apparatus comprising an antenna device, wherein the antenna device includes a conductive member, a wiring substrate including a coupling line that is conductive and different from the conductive member,
   a connecting conductor electrically connecting the conductive member and the coupling line, and a feeding coil disposed on the wiring substrate and magnetic-field coupled to the coupling line, and wherein at least the conductive member, the coupling line, and the connecting conductor define a current path.

18. The electronic apparatus according to claim 17, wherein the conductive member is a portion of a housing that accommodates the wiring substrate.

19. The electronic apparatus according to claim 18, wherein the housing includes a conductor aperture.

20. The electronic apparatus according to claim 19, wherein:
   the electronic apparatus includes a camera module; and
   the conductor aperture faces the camera module.

* * * * *